(12) United States Patent
Nakamura

(10) Patent No.: US 6,748,012 B2
(45) Date of Patent: Jun. 8, 2004

(54) MULTIUSER RECEIVER AND COMMUNICATION SYSTEM THAT PERFORMS MULTICODE TRANSMISSION

(75) Inventor: Tadashi Nakamura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 10/255,060

(22) Filed: Sep. 24, 2002

(65) Prior Publication Data

US 2003/0026327 A1 Feb. 6, 2003

Related U.S. Application Data

(63) Continuation of application No. PCT/JP00/01862, filed on Mar. 27, 2000.

(51) Int. Cl.$^7$ ................................................. H04B 1/69
(52) U.S. Cl. ...................................... 375/148; 375/130
(58) Field of Search .............................. 375/148, 130, 375/150, 316, 349, 325, 144; 370/335, 342, 479

(56) References Cited

U.S. PATENT DOCUMENTS

| | | | | |
|---|---|---|---|---|
| 5,291,519 A | * | 3/1994 | Tsurumaru | 375/230 |
| 6,282,233 B1 | * | 8/2001 | Yoshida | 375/148 |
| 6,304,624 B1 | * | 10/2001 | Seki et al. | 375/365 |
| 6,438,362 B1 | * | 8/2002 | Amezawa | 455/226.3 |
| 6,496,144 B2 | * | 12/2002 | Tanaka et al. | 342/378 |

FOREIGN PATENT DOCUMENTS

| | | |
|---|---|---|
| EP | 0 762 666 | 3/1997 |
| EP | 0 898 379 | 2/1999 |
| EP | 0 964 529 | 12/1999 |
| JP | 8-84096 | 3/1996 |
| JP | 10-190626 | 7/1998 |
| JP | 10-262028 | 9/1998 |
| JP | 11-275059 | 10/1999 |

* cited by examiner

*Primary Examiner*—Khai Tran
(74) *Attorney, Agent, or Firm*—Katten Muchin Zavis Rosenman

(57) ABSTRACT

A plurality of receiving units (26) forming a multiuser receiver are each provided with a selector (2) which selects for use either a propagation path estimated value determined by a propagation path estimator (18) contained in the same receiving unit or a propagation path estimated value determined by a propagation path estimator contained in another receiving unit. When the despreading code used in a first despreader (10) is a pilot signal despreading code, the selector (20) selects the propagation path estimated value determined by the propagation path estimator (18) based on the despread pilot signal output from the first despreader (10), and supplies the selected propagation path estimated value to a coherent detector (24), while when a user channel despreading code is used in the first despreader (10), the selector (20) selects the propagation path estimated value determined in another receiving unit and supplies it to the coherent detector (22, 24).

8 Claims, 12 Drawing Sheets

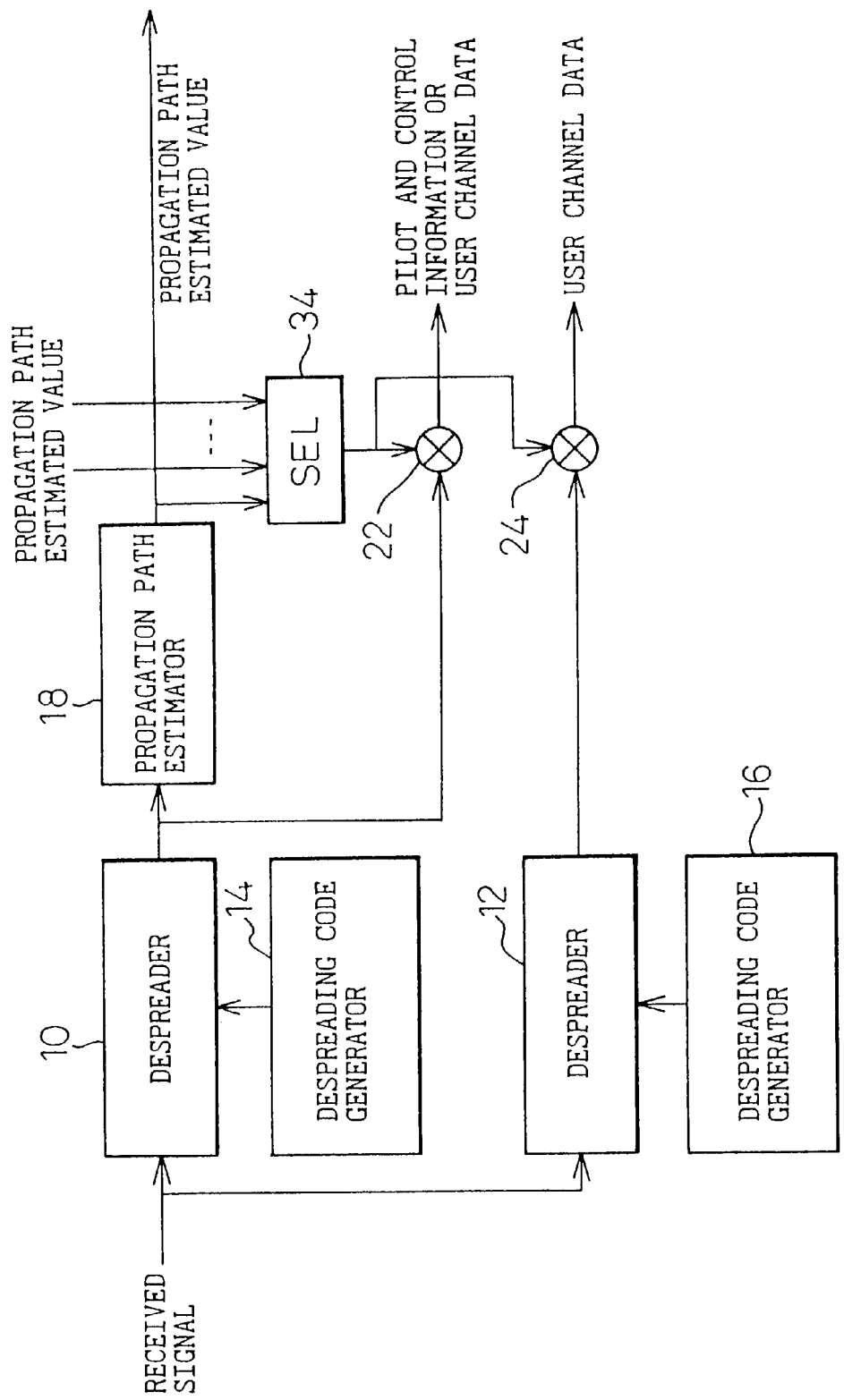

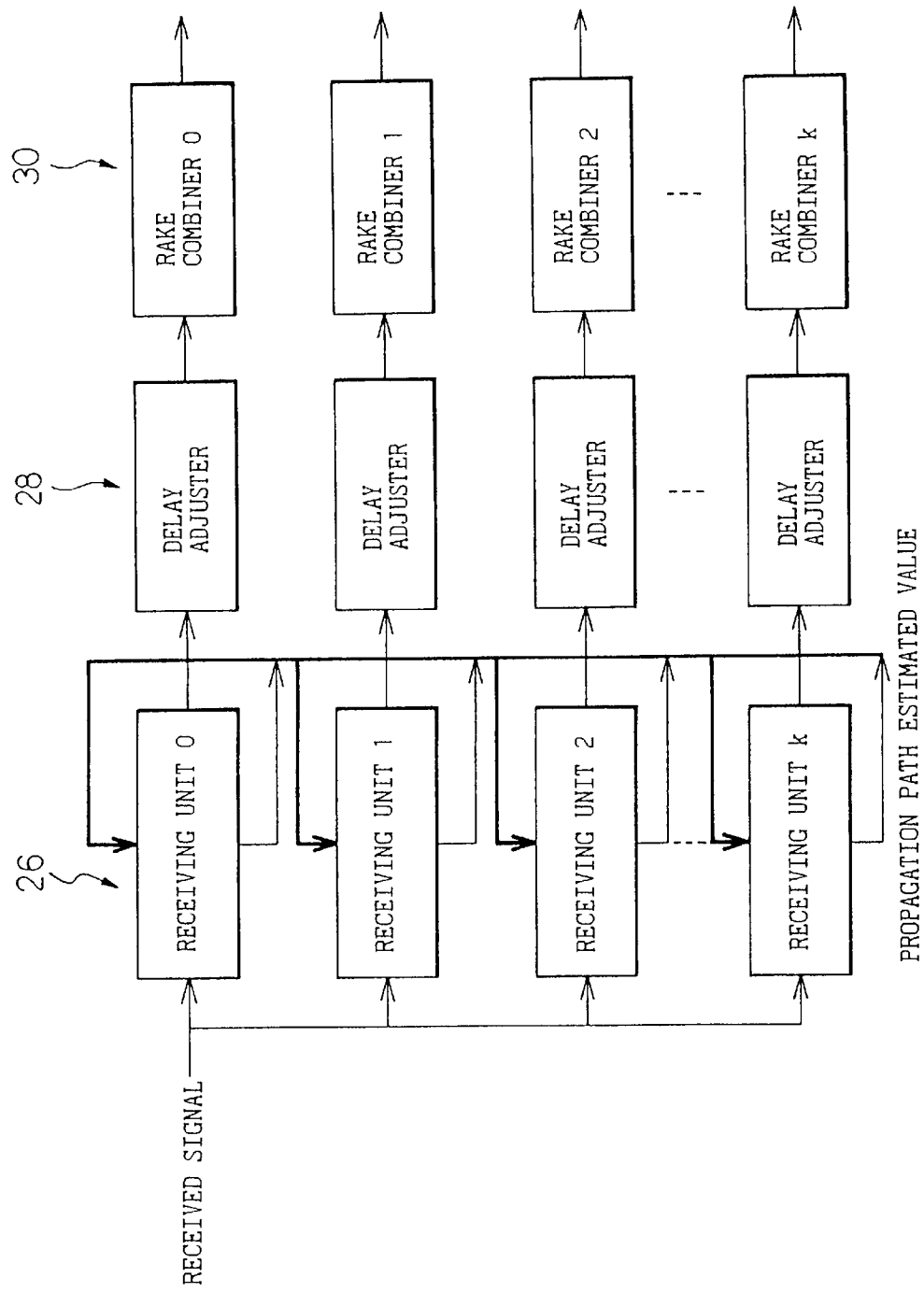

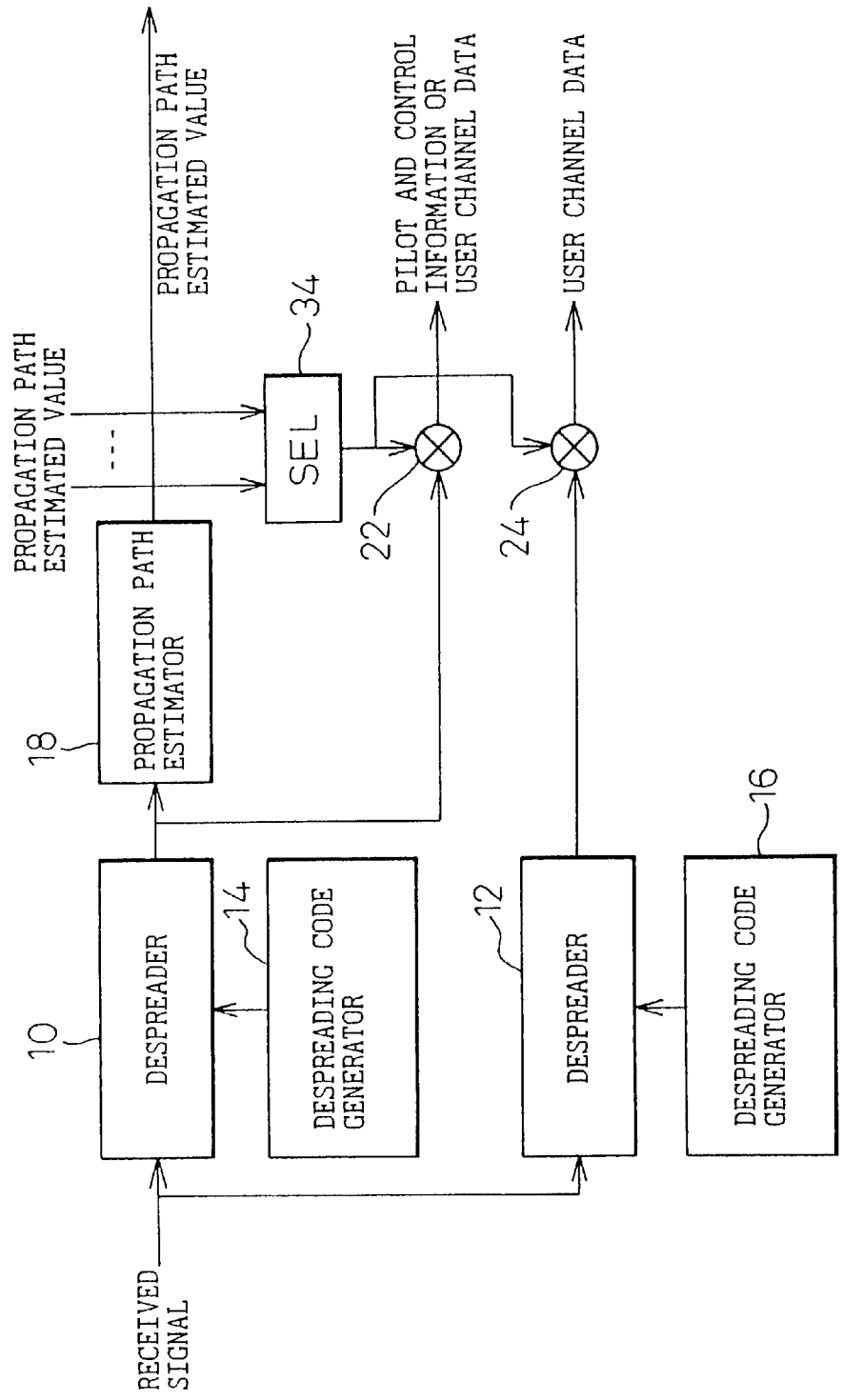

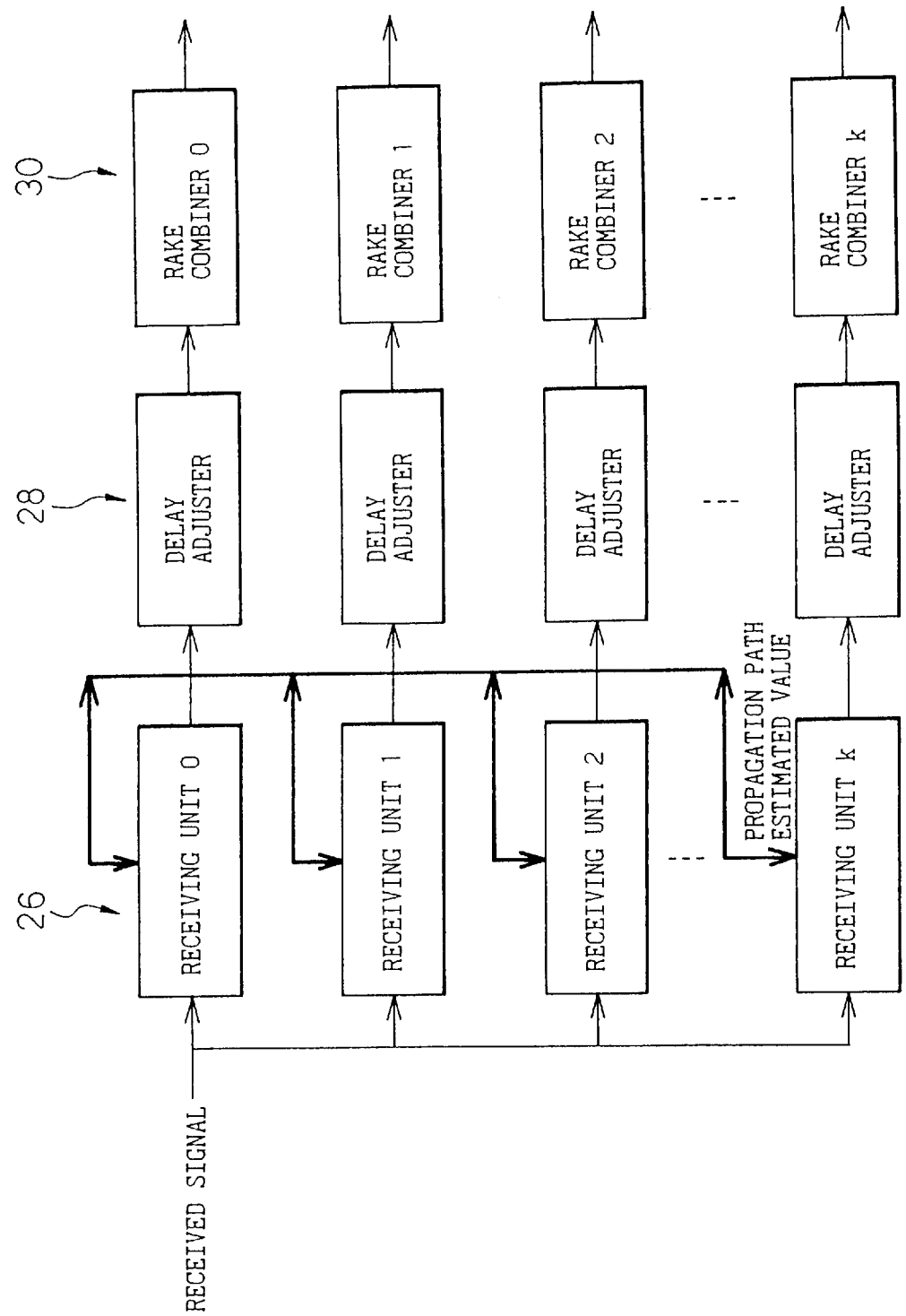

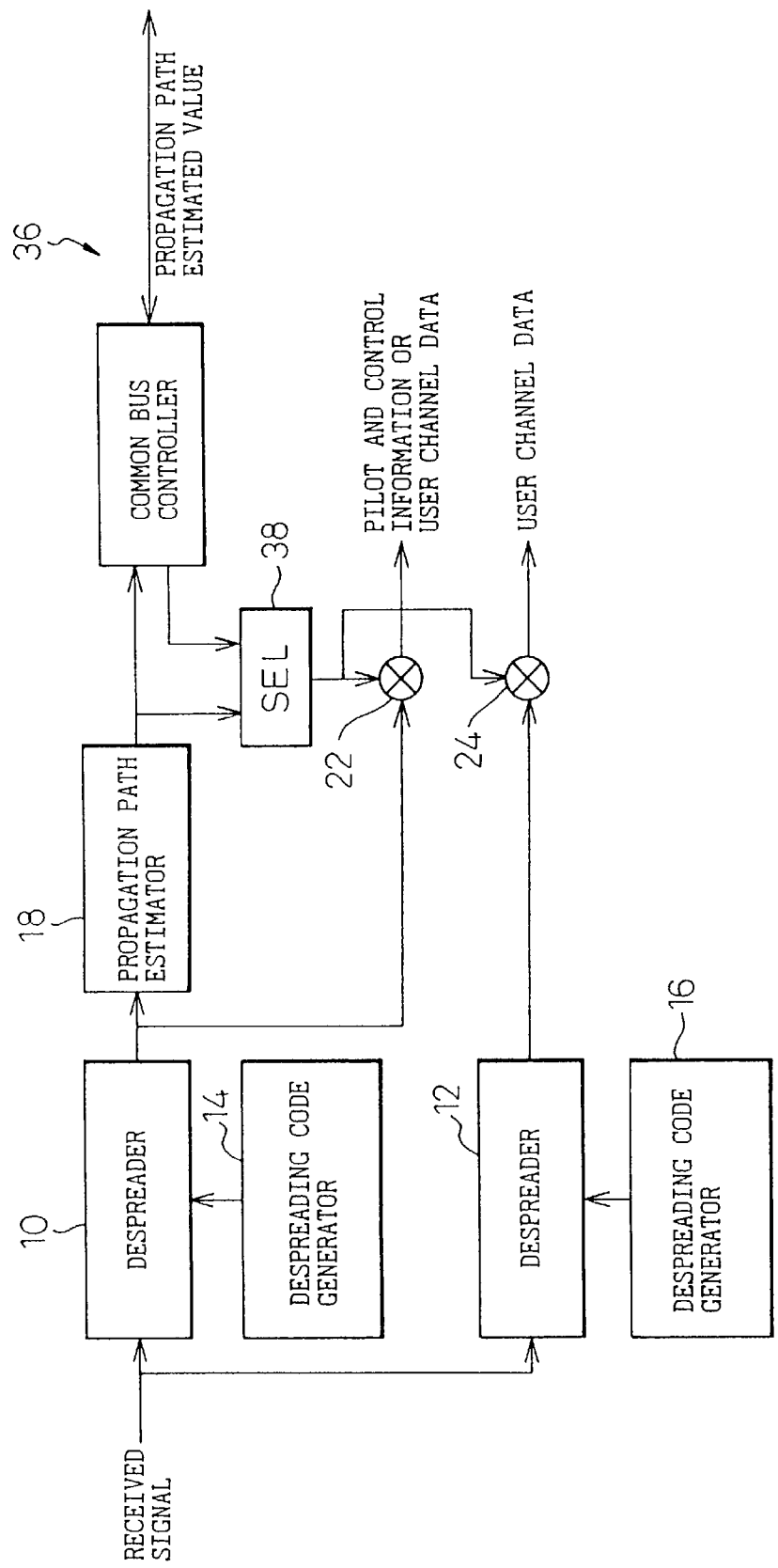

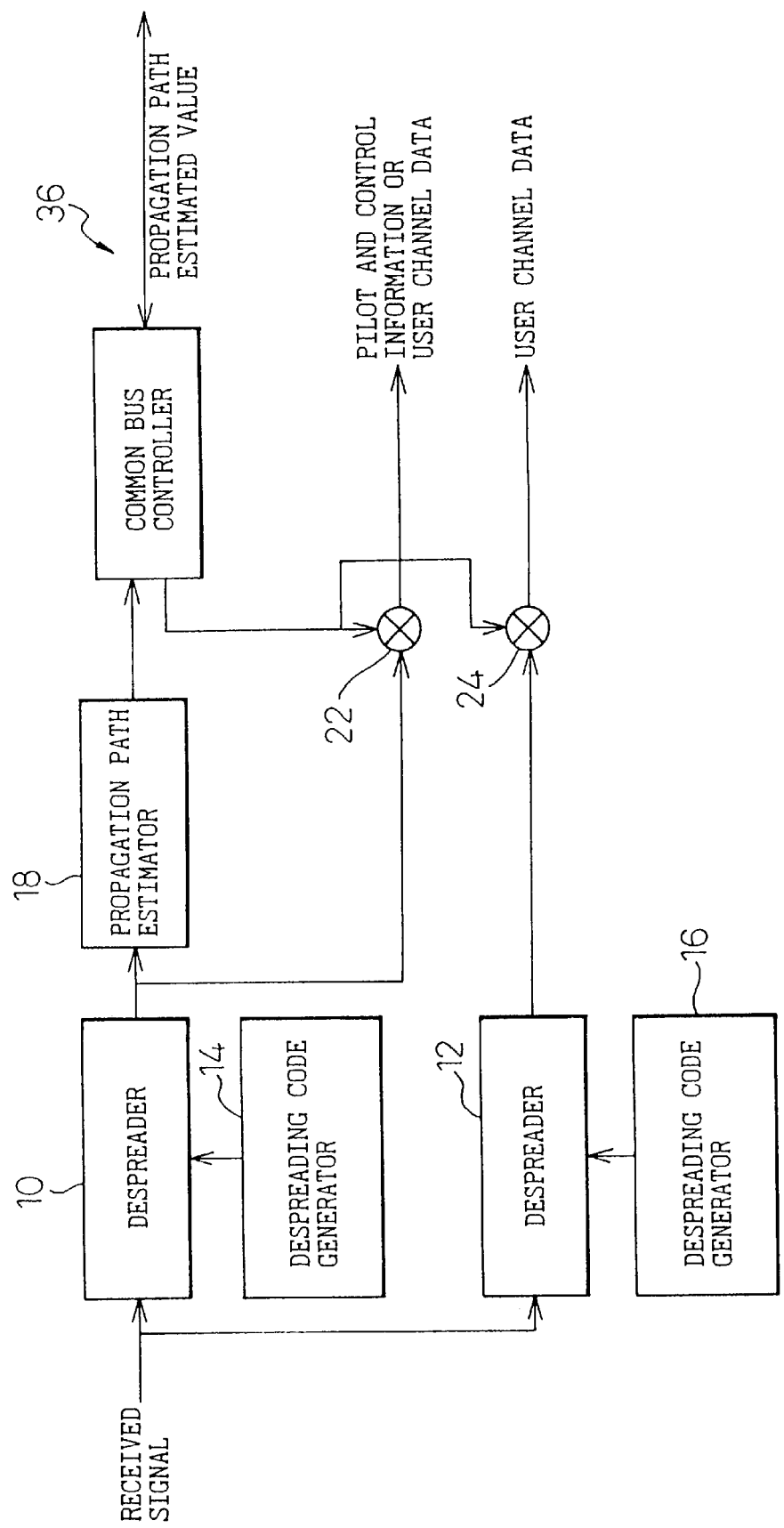

MULTIUSER RECEIVER AND COMMUNICATION SYSTEM THAT PERFORMS MULTICODE TRANSMISSION

CROSS-REFERENCE TO RELATED APPLICATION

This application is a continuation application and is based upon PCT/JP00/01862, filed on Mar. 27, 2000.

TECHNICAL FIELD

The present invention relates to a multiuser receiver that performs coherent detection by despreading the signals received from a large number of users, including not only users to each of whom a single spreading code is assigned but also users who use multicode transmission with each user assigned a plurality of spreading codes, such as a receiver provided at a base station in a DS-CDMA (direct-spread code division multiple access) mobile communication system. The invention also relates to a communication system that performs multicode transmission.

BACKGROUND ART

Digital cellular wireless communication systems using DS-CDMA technology are being developed as next generation mobile communication systems that achieve wireless multimedia communications. CDMA is a system that performs simultaneous communications by assigning channels using codes, and it is said that CDMA provides an access method that is suitable for mobile multimedia communications since it can achieve high-speed communications by performing multicode transmission in which each user uses a plurality of channels.

A mobile communication system using DS-CDMA employs a coherent detection method in which a pilot signal or pilot and control information is transmitted over a channel different from the channels used for user data transmission, and the receiving end estimates the condition of the propagation path based on the received signal or information, and corrects the signal phase of user data based on the estimated value for the propagation path.

In the case of single-code transmission in which a single spreading code is assigned to each user, the pilot signal and data signal from the user are mapped to I-phase and Q-phase components, respectively, in QPSK demodulation. In the case of multicode transmission, one channel of pilot signal and a plurality of channels of data signal are transmitted from each user. It is required that a base station accommodate these users in a dynamic and flexible manner with a minimum amount of circuitry. In particular, in a configuration that employs an interference canceller such as the one disclosed in Japanese Unexamined Patent Publication No. 10-51353, as it is more effective to perform interference cancellation by preferentially selecting higher-speed users, user signal demodulation circuits for generating interference replicas are required to be able to serve as many high-speed users as possible by using a limited amount of circuitry. For this purpose, provisions must be made so that as many high-speed users as possible can be assigned, according to changes in user using conditions, for processing to a limited number of despreading circuits and coherent detection circuits provided for interference replica generation.

DISCLOSURE OF THE INVENTION

Accordingly, it is an object of the present invention to provide a multiuser receiver that can flexibly accommodate a plurality of users differing in transmission speed, according to the conditions, and a communication system that performs multicode transmission.

According to the present invention, there is provided a multiuser receiver comprising a plurality of receiving units and capable of assigning an arbitrary number of receiving units to each user in a dynamic and flexible manner in order to achieve reception from a plurality of users transmitting at different transmission speeds, wherein each of the plurality of receiving units includes: first and second despreaders each for despreading a received signal by a despreading code; a propagation path estimator which, when the despreading code used in the first despreader is a code for despreading a pilot signal, determines and outputs a propagation path estimated value based on the pilot signal output from the first despreader; and a first phase corrector which, based on the propagation path estimated value, corrects the phase of the despread received signal output from the second despreader, and wherein each of at least some of the plurality of receiving units further includes: a first selector which selects either the propagation path estimated value determined by the propagation path estimator contained in the same receiving unit or the propagation path estimated value determined by the propagation path estimator contained in another receiving unit, and supplies the selected propagation path estimated value to the first phase corrector; and a second phase corrector which corrects the phase of the despread received signal output from the first despreader by using the propagation path estimated value supplied from that other receiving unit and selected by the first selector.

According to the present invention, there is also provided a communication system that performs multicode transmission in which a plurality of channels that can be regarded as being equal in terms of propagation path effects are assigned to a transmitter and a receiver according to a bandwidth of transmit information, wherein the transmitter transmits a known signal for propagation path estimation by using either one of in-phase and quadrature components on one of the plurality of channels, and transmits the transmit information by using the other one of the components on the other channels, and the receiver performs propagation path estimation from the known signal and, using results of the propagation path estimation, coherently detects the channels carrying the transmit information.

BRIEF DESCRIPTION OF THE DRAWINGS

FIG. 7 is a block diagram showing a further example of the receiving unit;

FIG. 8 is a block diagram showing a multiuser receiver comprising a plurality of receiving units each identical in configuration to the one shown FIG. 7;

FIG. 9 is a block diagram showing a still further example of the receiving unit;

FIG. 10 is a block diagram showing a multiuser receiver comprising a plurality of receiving units each identical in configuration to the one shown FIG. 9;

FIG. 11 is a block diagram showing yet another example of the receiving unit; and FIG. 12 is a block diagram showing a yet further example of the receiving unit.

BEST MODE FOR CARRYING OUT THE INVENTION

Figure 1:
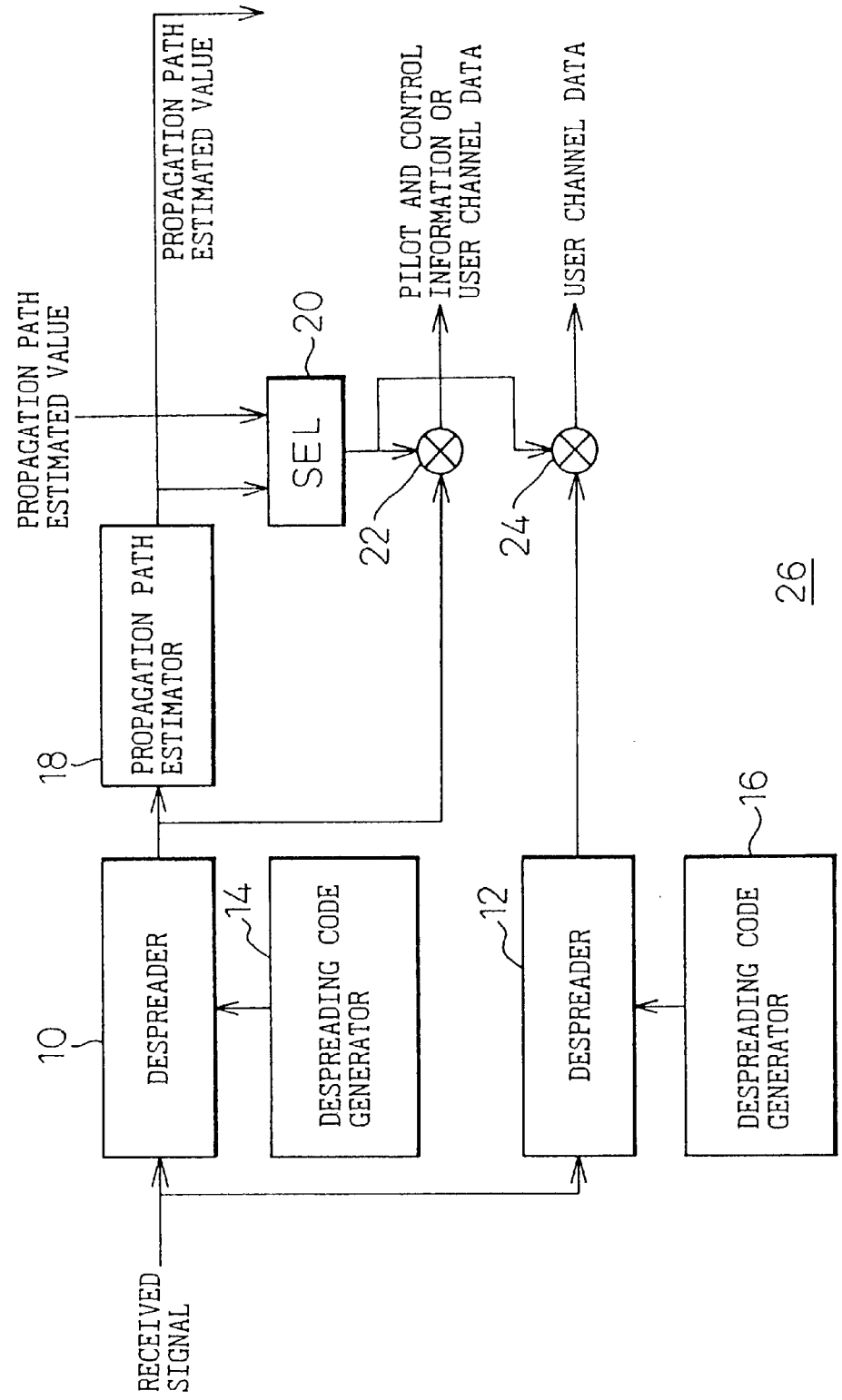
FIG. 1 is a block diagram showing one of the receiving units contained in a multiuser receiver according to one embodiment of the present invention.

FIG. 1 shows one of the receiving units contained in a multiuser receiver according to one embodiment of the present invention. Despreaders 10 and 12 despread received signals by using despreading codes output from despreading code generators 14 and 16, respectively. When the despreading code output from the despreading code generator 14 is a despreading code for a pilot signal, a propagation path estimator 18 estimates the condition of the propagation path based on the despread pilot signal output from the despreader 10, and outputs a propagation path estimated value.

The propagation path estimated value output from the propagation path estimator 18 is supplied to one input of a selector 20 and also to another receiving unit. The selector 20 selects either the propagation path estimated value output from the propagation path estimator 18 or the propagation path estimated value supplied from the other receiving unit, and supplies the selected one to a coherent detector 22. When the despreading code output from the despreading code generator 14 is a despreading code for user channel data, the coherent detector 22 corrects the phase of the despread user channel data output from the despreader 10 by using the propagation path estimated value supplied from the other receiving unit and selected by the selector 20, and thereby coherently detects the user channel data. A coherent detector 24 corrects the phase of the user channel data output from the despreader 12 by using the propagation path estimated value selected by the selector 20. Here, when the code generated by the despreading code generator 14 is a despreading code for a pilot signal, the selector 20 selects the propagation path estimated value output from the propagation path estimator 18 in the same receiving unit, and when it is the user channel data despreading code, the selector 20 is switched to select the propagation path estimated value supplied from the other receiving unit.

Figure 2:
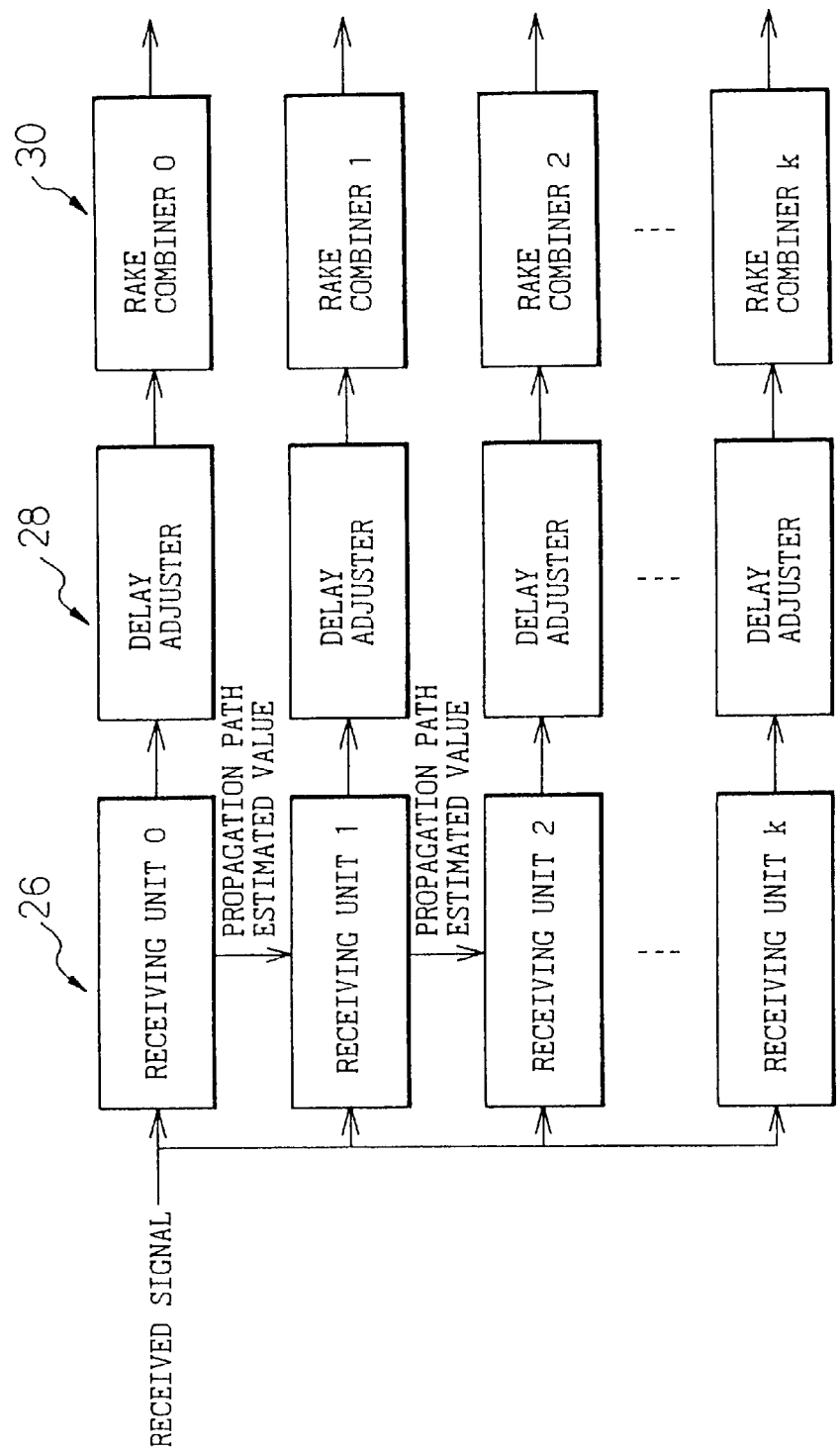
FIG. 2 is a block diagram showing a multiuser receiver comprising a plurality of receiving units each identical in configuration to the one shown FIG. 1.

When the receiving units 26 each having the above configuration are connected in parallel in such a manner that the propagation path estimated value output from the propagation path estimator in the receiving unit i ($0 \leq i \leq k-1$) is input to the selector in the receiving unit i+1, as shown in FIG. 2, multicode transmission users can be accommodated in a dynamic and flexible manner. For example, when accommodating a user who is using three codes in the receiving units 0 and 1, the selector in the receiving unit 1 is switched to select the propagation path estimated value supplied from the receiving unit 0. In the example shown in FIG. 2, the selector 20 in the receiving unit 0 is fixed to always select the output of the propagation path estimator 18 in the same receiving unit. In FIG. 2, a delay adjuster 28 adjusts the phases of signals arriving over different paths so that the signals match in phase, and a RAKE combiner 30 combines them using a RAKE structure.

Figure 3:
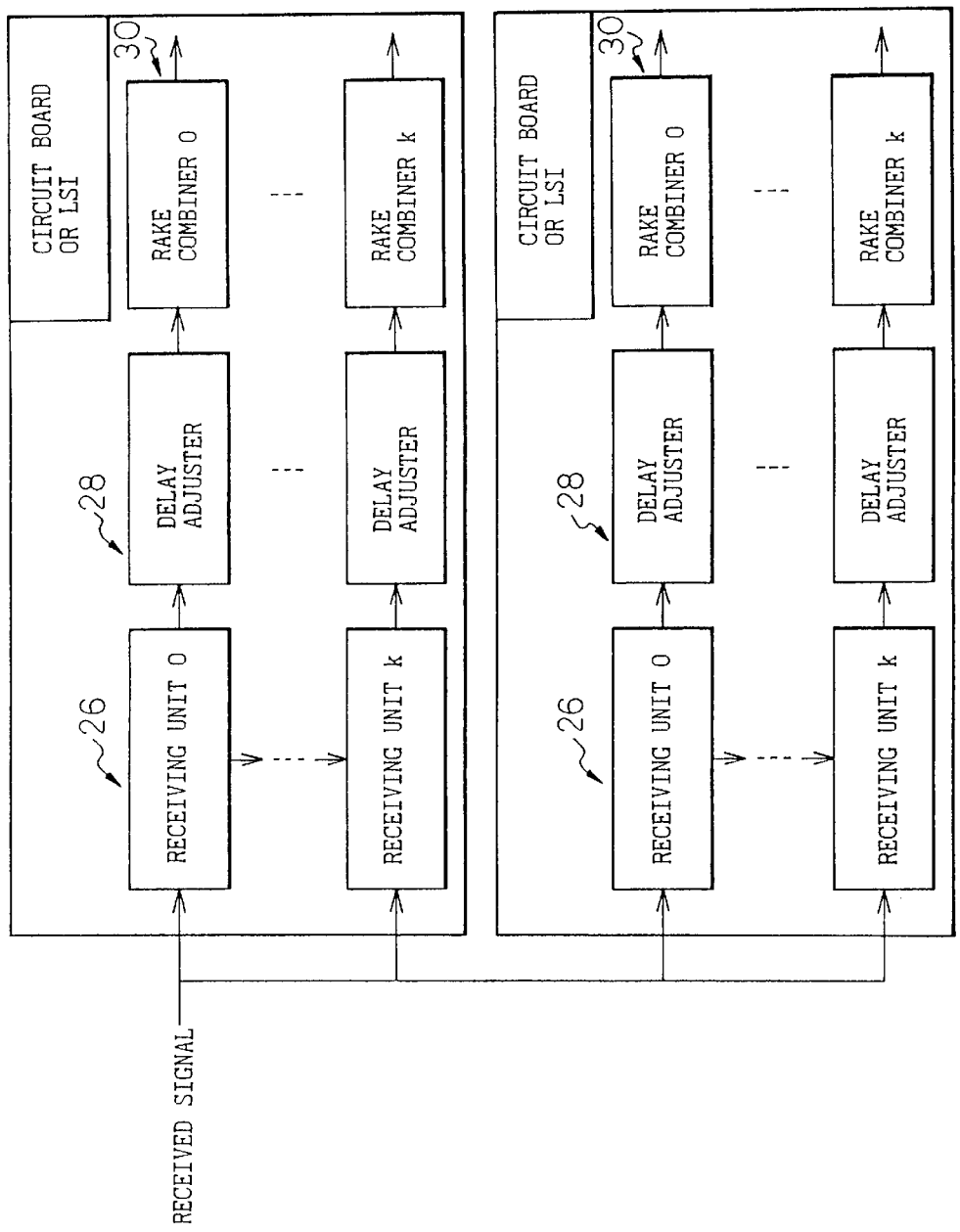
FIG. 3 is a block diagram showing another example of the multiuser receiver comprising a plurality of receiving units each identical in configuration to the one shown FIG. 1.

When the plurality of receiving units are mounted across different circuit boards or LSIs, transfers of the propagation path estimated values may be limited within each LSI or board, as shown, for example, in FIG. 3; this also applies to all other examples described hereinafter.

Figure 4:
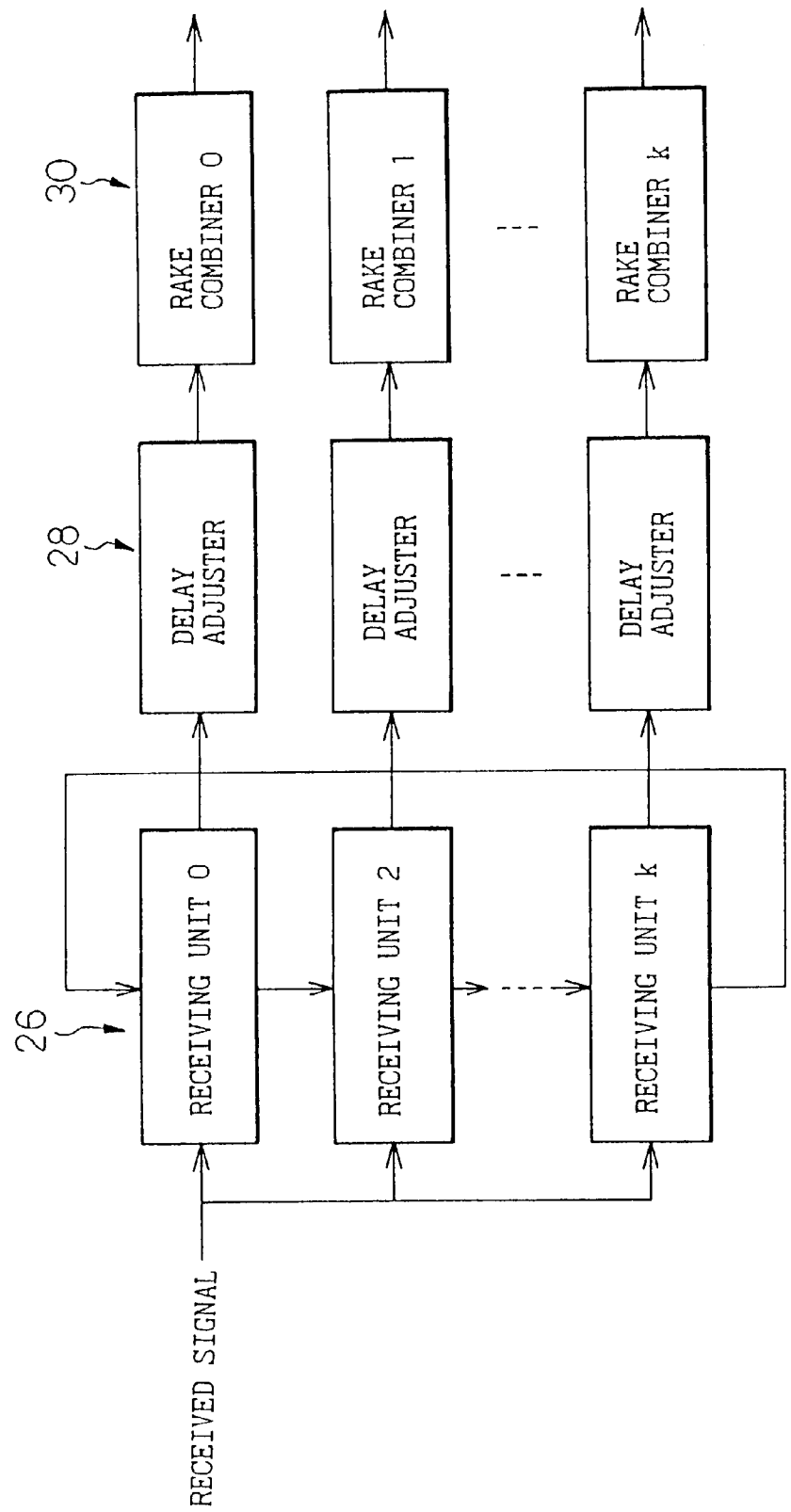
FIG. 4 is a block diagram showing a still another example of the multiuser receiver.

If the circuit is configured so that the propagation path estimated value from the receiving unit k can be used in the receiving unit 0 as shown in FIG. 4, the flexibility of receiving unit assignment will be enhanced.

Figure 5:
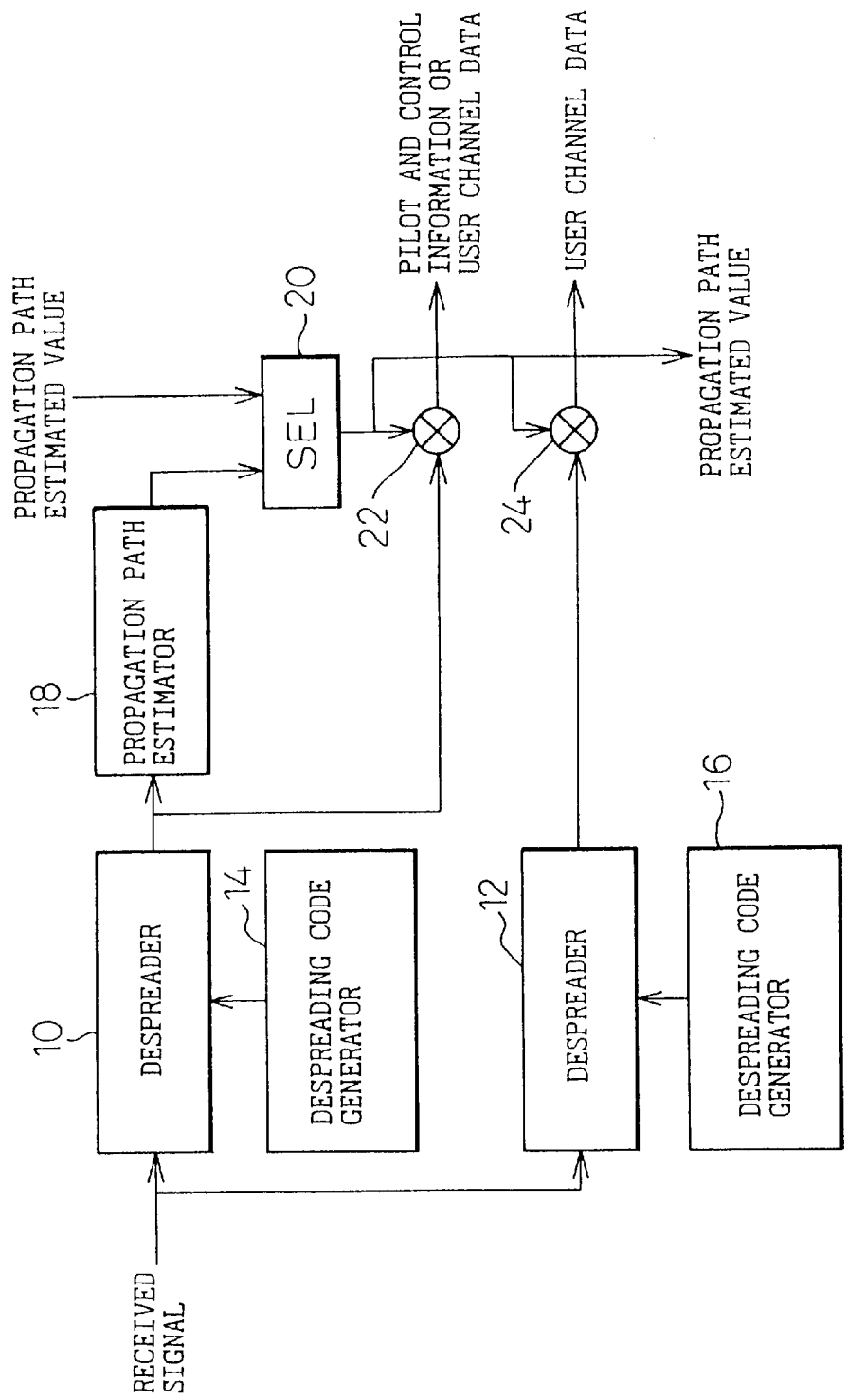
FIG. 5 is a block diagram showing another example of the receiving unit.

FIG. 5 shows another example of the receiving unit 26. The difference from FIG. 1 is that the propagation path estimated value passed to another receiving unit is the propagation path estimated value selected by the selector 20, not the output of the propagation path estimator 18. This makes the reception of four or more multicode transmissions possible. For example, if the selector in the receiving unit 1 is made to select the propagation path estimated value supplied from the receiving unit 0, and the selector in the receiving unit 2 is made to select the propagation path estimated value selected by the selector in the receiving unit 1, a user using five codes can be accommodated by the receiving units 0, 1, and 2.

Figure 6:
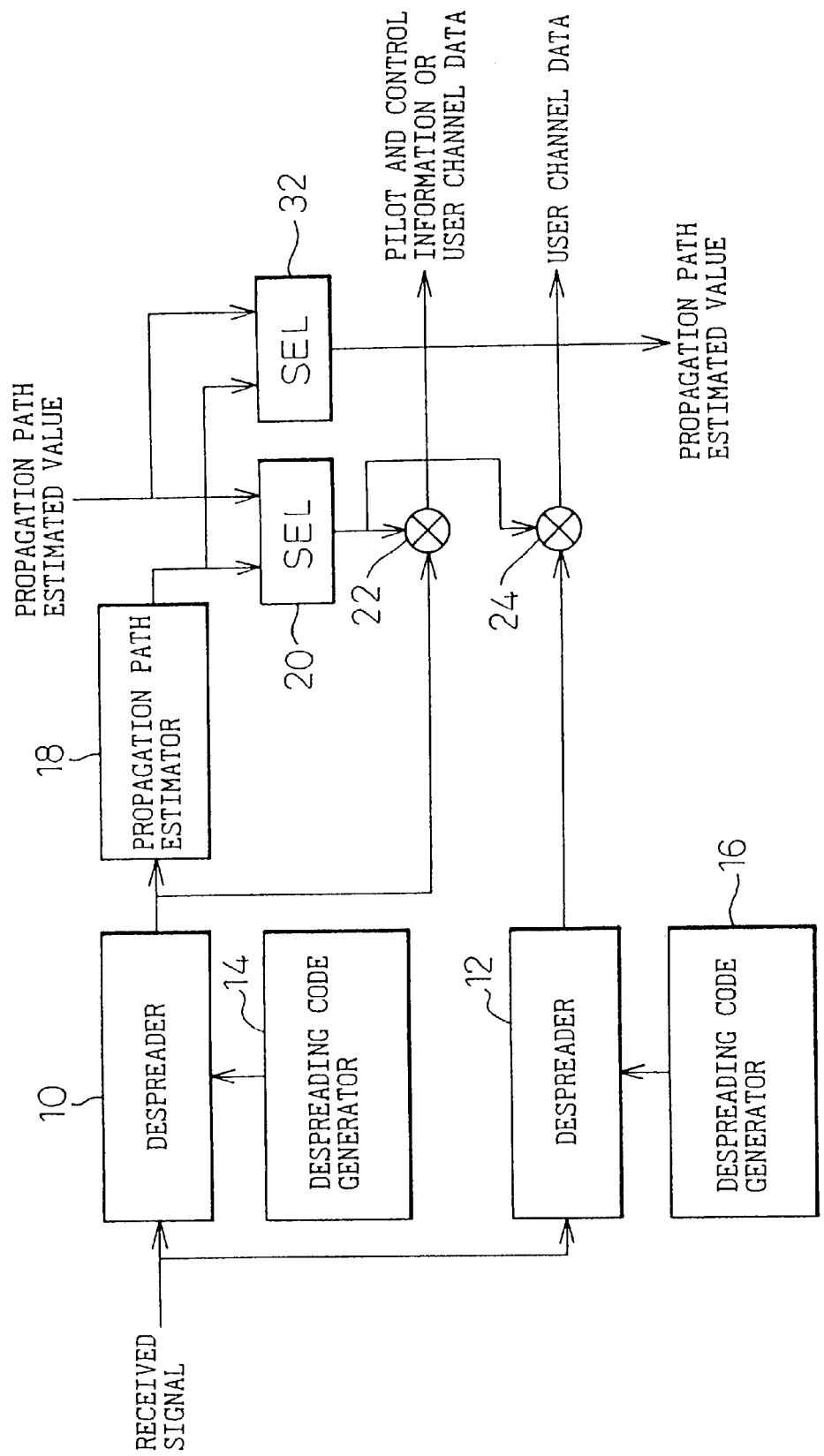
FIG. 6 is a block diagram showing still another example of the receiving unit.

FIG. 6 shows a still another example of the receiving unit 26. The difference from FIG. 5 is the addition of a selector 32 which selects a propagation path estimated value selected and supplies it to another receiving unit. This makes it possible to assign nonadjacent receiving units, for example, the receiving unit 0 and the receiving unit 2, to one user. For example, when the receiving units 0 and 1 are respectively assigned to different users each using a single code, if the user to whom the receiving unit 0 is assigned tries to perform multicode transmission, in the earlier given examples, channel remapping becomes necessary; in contrast, if some other receiving unit can be assigned by skipping the receiving unit 1, as in the example shown here, a plurality of receiving units can be assigned without requiring channel remapping.

FIG. 7 shows a further example of the receiving unit 26. The propagation path estimated values from all the receiving units, including the propagation path estimated value output from the propagation path estimator 18 in the same receiving unit, are input to the selector 34 which selects one of them for output to the coherent detectors 22 and 24. FIG. 8 shows a multiuser receiver comprising such receiving units.

FIG. 9 shows a still further example of the receiving unit 26. The difference from FIG. 7 is that the propagation path estimated value output from the propagation path estimator 18 in each receiving unit is not directly input to the selector, but is once output from the unit. In this way, by inputting the once output propagation path estimated value to the selector 34 together with the propagation path estimated values output from the other receiving units, propagation path estimated value selection information conforming to the same rule can be used at all the receiving units. FIG. 10 shows a multiuser receiver comprising such receiving units.

FIG. 11 shows yet another example of the receiving unit 26. In this example, a common bus 36 is used to minimize the number of signal lines for transmitting the propagation path estimated values. The selector 38 selects either the propagation path estimated value output from the propagation path estimator 18 in the same receiving unit or the propagation path estimated value received via the common bus 36, and supplies the selected propagation path estimated value to the coherent detectors 22 and 24.

FIG. 12 shows a yet further example of the receiving unit 26. In this example, a common bus 36 is used to minimize the number of signal lines for transmitting the propagation path estimated values, and the propagation path estimated value determined in the same receiving unit is also output onto the common bus, thereby omitting the selector 38 of FIG. 11.

What is claimed is:

1. A multiuser receiver comprising a plurality of receiving units and capable of assigning an arbitrary number of receiving units to each user, each of the plurality of receiving units including:
   first and second despreaders each for despreading a received signal by a despreading code;
   a propagation path estimator which, when the despreading code used in the first despreader is a code for despreading a pilot signal, determines and outputs a propagation path estimated value based on the pilot signal output from the first despreader; and
   a first phase corrector which, based on the propagation path estimated value, corrects the phase of the despread received signal output from the second despreader,
   each of at least some of the plurality of receiving units further including:
      a first selector which selects either the propagation path estimated value determined by the propagation path estimator contained in the same receiving unit or the propagation path estimated value determined by the propagation path estimator contained in another receiving unit, and supplies the selected propagation path estimated value to the first phase corrector; and
      a second phase corrector which corrects the phase of the despread received signal output from the first despreader by using the propagation path estimated value supplied from the other receiving unit and selected by the first selector.

2. A multiuser receiver according to claim 1, wherein when $2 \leq i \leq n$ where n is the number of receiving units, the propagation path estimated value determined by the propagation path estimator in an (i−1)th receiving unit is input to the first selector in an ith receiving unit.

3. A multiuser receiver according to claim 2, wherein the propagation path estimated value determined by the propagation path estimator in an nth receiving unit is input to the first selector in the first receiving unit.

4. A multiuser receiver according to claim 1, wherein when $2 \leq i \leq n$ where n is the number of receiving units, the propagation path estimated value selected by the first selector in an (i−1)th receiving unit is input to the first selector in an ith receiving unit.

5. A multiuser receiver according to claim 1, wherein each of the at least some of the plurality of receiving units further includes a second selector which selects either the propagation path estimated value determined by the propagation path estimator contained in the same receiving unit or the propagation path estimated value determined by the propagation path estimator contained in another receiving unit, and wherein
   when $2 \leq i \leq n$ where n is the number of receiving units, the propagation path estimated value selected by the second selector in an (i−1)th receiving unit is input to the first selector in an ith receiving unit.

6. A multiuser receiver according to claim 1, wherein the first selector selects one of the propagation path estimated values determined by the propagation path estimators in all the receiving units.

7. A multiuser receiver according to claim 1, further comprising a common bus for enabling the propagation path estimated values determined by the propagation path estimators in all the receiving units to be supplied to every one of the receiving units.

8. A communication system that performs multicode transmission in which a plurality of channels that can be regarded as being equal in terms of propagation path effects are assigned to a transmitter and a receiver according to a bandwidth of transmit information, wherein
   the transmitter transmits a known signal for propagation path estimation by using either one of in-phase and quadrature components on one of the plurality of channels, and transmits the transmit information by using the other one of the components and at least one of the other channels, and
   the receiver performs propagation path estimation from the known signal and, using results of the propagation path estimation, coherently detects the channels carrying the transmit information.

* * * * *